Nov. 20, 1962    N. K. BARSNESS ET AL    3,064,453
UNIVERSAL JOINT
Filed April 27, 1960

INVENTORS.
NORRIS K. BARSNESS
LESTER P. MEYER
A. MILTON JOHNSON
CLAYTON C. THOMPSON
BY
Merchant & Merchant
ATTORNEYS 3,064,453
UNIVERSAL JOINT
Norris K. Barsness and Lester P. Meyer, Glenwood, Andrew M. Johnson, Montevideo, and Clayton C. Thompson, Glenwood, Minn., assignors to Glenwood Minnewaska Sales, Inc., Glenwood, Minn., a corporation of Minnesota
Filed Apr. 27, 1960, Ser. No. 24,988
1 Claim. (Cl. 64—18)

This invention relates generally to couplings for transmitting rotary motion from a driving shaft to a driven shaft, and more particularly it relates to a coupling joint of the universal type which is especially useful in connection with shafts which require disposition in great angular relation with respect to one another.

The use of previous constructions of universal joints in connection with shafts which are disposed at large angles has been generally unsatisfactory since such use is characterized by excessive friction, noise and wear caused by unsteady movement. In light of the above, an important object of this invention is the provision of a universal joint which may be successfully used at relatively large angles since it is constructed to substantially obviate vibration of itself and adjacent parts.

Another important object of this invention is the provision of a universal joint which is constructed so as to overcome the tendency of previous types of universal joints to "wrap up" when the driving shaft and the driven shafts are disposed at relatively great angles with respect to one another.

Another important object of this invention is the provision of a universal joint which is constructed so as to efficiently perform the above objects without the need for restricters commonly used to prevent "slapping" of the various parts of common universal joints.

A further object of this invention is the provision of a universal joint which is constructed so as to employ the stabilizing benefits inherent in the rotational action resulting from the use of masses balanced on the respective axes of the driving and driven shafts.

A still further object of our invention is the provision of a universal joint which is simple in design, strong and durable in construction and extremely efficient in its operation.

A still further object of this invention is the provision of a shaft stabilizer for use in combination with the driven shaft of a universal joint and adapted to stabilize the same during rotation thereof and for manually adjusting the angularity between the driving and driven shafts.

A still further object of this invention is the provision of a protractor clamping bracket connected to and for use in combination with a pair of angularly and universally coupled shafts for determining and exhibiting the magnitude of the angle supplementary to the angle included between said shafts.

The above and still further objects of this invention will become apparent from the following detailed specification, appended claim and attached drawings.

Referring to the drawings wherein like reference characters indicate like parts or elements throughout the several views.

Figure 1:
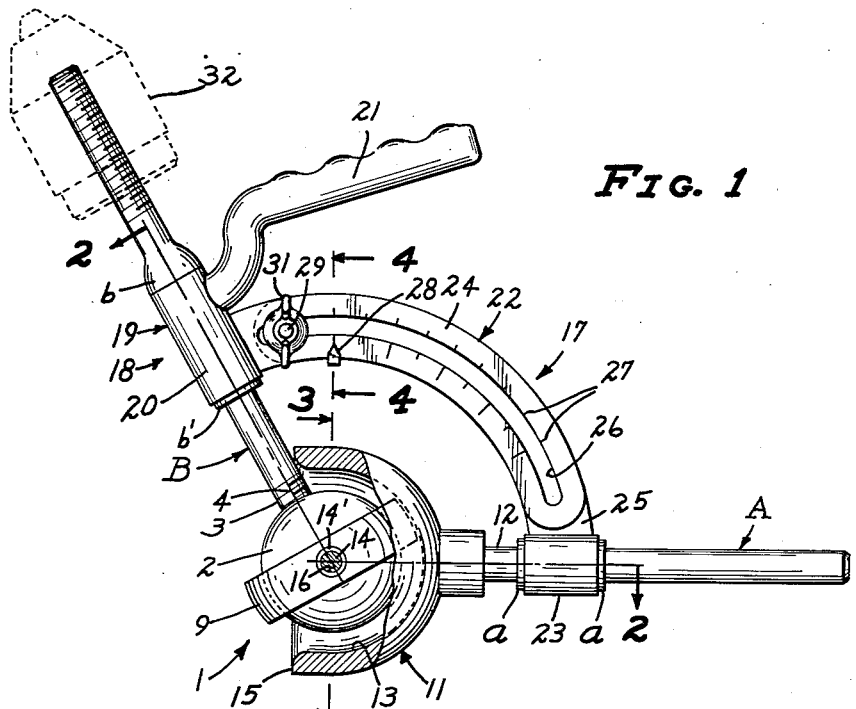
FIG. 1 is a plan view of our invention with some parts broken away and some parts shown in section.

Referring with greater particularity to the drawings, the reference letters A and B represent generally the respective shafts which are coupled by this invention. For purposes of simplification and clarification of this specification, the shaft A will be referred to as the driving shaft and the shaft B will be referred to as the driven shaft, although it is to be understood that this invention comprehends a universal joint in which either of the shafts A and B may be the driving shaft or the driven shaft. The reference numeral 1 represents a universal joint in its entirety, which has its greatest utility in connection with the widely angularly disposed shafts A and B, as seen particularly in FIG. 1.

Figure 2:
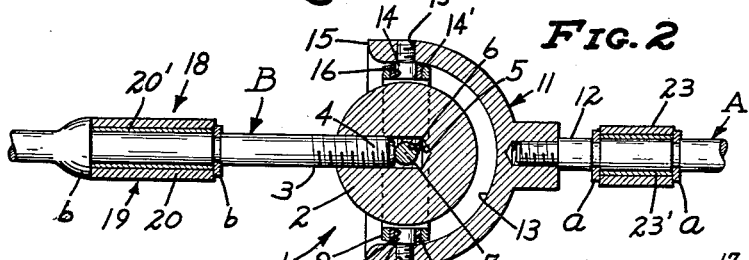
FIG. 2 is a longitudinal view in section taken on the line 2—2 of FIG. 1.

The universal joint 1 comprises a generally spherical joint head 2 which is rigidly connected to one end 3 of the driven shaft B. Preferably, and as shown, the connected end 3 of the shaft B is screw-threaded, as at 4 and received within a drilled and screw-threaded aperture 5 in the joint head 2. The joint head 2 is apertured, as at 6, about a diametrically extending axis that is generally normal to the axis of the driven shaft B. A pivot pin 7 is snugly received within the aperture 6 and extends axially beyond said joint head 2 on opposite sides thereof so as to define a first pair of trunnions 8. The pivot pin 7 is secured within the aperture 6 by the further tightening of the shaft B so that the end 3 thereof abuts against the pin 7, as seen particularly in FIG. 2. A generally circular gimbal ring 9 encompasses said joint head 2 and defines a pair of diametrically opposite apertures 10 which receive said first trunnions 8 so as to pivotally connect the gimbal ring 9 to said joint head 2 about an axis generally normal to the axis of the driven shaft B. The inner diameter of the ring 9 is greater than the diameter of said spherical joint head 2.

Figure 3:
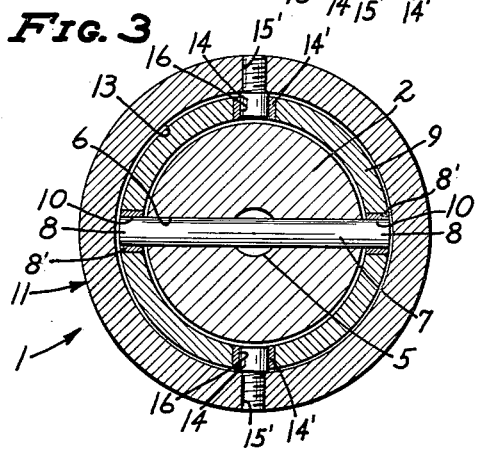
FIG. 3 is an enlarged view in vertical section taken on the line 3—3 of FIG. 1 with the respective shafts being disposed in co-axial relationship.

A generally hemispherical joint socket, represented generally by the reference numeral 11, is rigidly secured to one end 12 of the driving shaft A. The joint socket 11 defines an axially opening generally hemispherical cup portion 13 which is of a diameter greater than the outer diameter of the gimbal ring 9 and therefore adapted to receive said ring 9 and the joint head 2. The joint socket 11 includes a second pair of diametrically opposite axially inwardly projecting screw-threaded trunnions 14 which are spaced near the marginal cup edge 15 of the socket 11 and are received within the screw-threaded apertures 15'. The gimbal ring 9 defines a second pair of diametrically opposite radially extending apertures 16 disposed about an axis generally normal to the axis of the apertures 10. The ring 9 is adapted to be received within the cup portion 13 and pivotally connected thereto about an axis generally normal to the axis of the driving shaft A and also normal to the axis of the pivot pin 7 by means of the pivotal reception of the second trunnions 14 within the apertures 16. As seen particularly in FIG. 3 the trunnions 8 and 14 are disposed within corresponding friction bearings 8' and 14' which are received within the apertures 10 and 16. It should be obvious from the above, that a universal joint 1 is provided in which rotation of either of the shafts A and B is transferred to the gimbal ring 9 and ultimately imparted to the other of the shafts A and B. An important novel aspect of this invention resides in the fact that a universal joint constructed in accordance with this specification may be successfully used in connection with a pair of shafts in which the angle included between the axis of one of the shafts and the extended axis of the other of the shafts is as great as 60°. Furthermore, the same may be used in such a position at any reasonable r.p.m. without any unsatisfactory vibration or "slapping." This is thought to be due to the small amount of axial adjustment of the trunnions 8, 14 which is permitted by this device upon each revolution of the universal joint 1. This is shown particularly in FIG. 3, wherein it will be noticed that the clearance between the joint head 2 and the gimbal ring 9 is such as to permit minor axial adjustment between the trunnions 8 and the bearings 8', the clearance between the gimbal ring 9 and the joint socket 11 also being such as to permit minor axial adjustment between the trunnions 14 and the bearings 14'. Although the complete explanation for the success of this invention is not entirely understood at this time, it is presently thought that it derives its novel qualities from the balancing or gyroscopic action provided by the addition of the balanced weight to both the joint head 2 and the joint socket 11.

Before continuing with the remainder of this specification on the other parts of our invention, the method of assembling the universal joint 1 will be first set forth. Although other equally efficient methods for assembling this invention are apparent, one method thereof consists in first securing the joint socket 11 to the driving shaft A. Then the gimbal ring 9 is received within the socket 11, and the second trunnions 14 are inserted through the apertures 16 in the ring 9 from the interior thereof, and then screwed into the apertures 15'. Then the joint head 2 is loosely secured to the driven shaft B, and the combination is inserted within the ring 9 so that the apertures 6 and 10 are aligned. Then the ring 9 and joint head 2 are rotated to a position similar to that shown in FIG. 1, and the pivot pin 7 is inserted through both thereof so as to secure the ring 9 to the joint head 2.

As seen particularly in FIG. 1, our invention may be used in connection with a combination shaft stabilizer and protractor clamping bracket, represented generally by the reference numeral 17, which will hereinafter be described. The shaft stabilizer, represented generally by the reference numeral 18, is particularly useful for manually guiding and holding the driven shaft B of the universal joint 1. The stabilizer 17 includes a bearing unit 19 which comprises an elongated cross-sectionally circular sleeve 20 fitted with a suitable friction bearing 20' both of which are rotatably received on the driven shaft B. The bearing unit 19 defines a generally radially outwardly extending hand grip 21 which is rigidly secured to the sleeve 20. When our invention is in use, the hand grip 20 is grasped so as to stabilize the driven shaft B during rotation thereof and also to manually adjust the angularity between the shafts A and B.

The combination bracket 17 further includes a protractor clamping member, represented generally by the reference numeral 22, which is connected to and for use in combination with the angularly disposed shafts A and B for setting the angularity therebetween. The protractor clamping member 22 comprises a sleeve 23 fitted with a suitable friction bearing 23' both of which are rotatably received on the driving shaft A in like manner as the sleeve 20 and bearing 20' are associated with the driven shaft B. It should also be noted that in order to prevent axial displacement of the stabilizer bearing 20 on the shaft B, a stop shoulder *b* and a snap ring *b'* are provided. Likewise, the bearing 23 is held against axial displacement by a pair of snap rings *a*.

Figure 4:
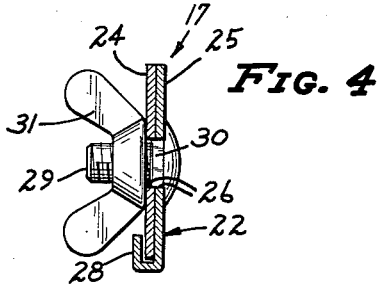
FIG. 4 is an enlarged detail view taken on the line 4—4 of FIG. 1.

The protractor clamping member 22 further comprises a pair of adjustable arcuately formed bar elements, represented by the reference numerals 24 and 25, which are rigidly secured at their opposite ends to the respective sleeve bearings 20 and 23, and are adapted to determine and exhibit the magnitude of the angle supplementary to the angle included between the shafts A and B. The bar elements 24 and 25 are disposed in a flat face-to-face related position with one another, as seen particularly in FIGS. 1 and 4. Both of the bar elements 24 and 25 define generally transversely centered elongated slots 26 which are alignable with one another when the bar elements 24 and 25 are disposed in said face-to-face relationship. One of the bar elements 24 is graduated, as at 27, and the other bar element 25 defines an index 28 which cooperates with the graduations 27 so as to indicate the magnitude of the angle supplementary to the angle included between the shafts A and B. For the purpose of providing means for removably clamping the bar elements 24 and 25 one against the other, so as to rigidly fix the angularity of the shafts A and B, a threaded bolt 29, having a squared shank 30, is received within the slots 26 and projects therethrough. A wing nut 31 is screwed on the bolt 29. After adjusting the shafts A and B so as to obtain the desired degree of angularity therebetween, the wing nut 30 is tightened against the bar elements 24 and 25 so as to clamp said bar elements 24 and 25 in the desired position.

It should be understood that the shaft stabilizer 18 and the protractor clamping member 22 may be separately constructed by dividing the sleeve 20 into a pair of axially spaced portions, not shown. Such a separation allows the independent use of the stabilizer 18 and the protractor member, which may be desirable in some cases.

It should be obvious from the above description, that a universal joint is provided which possesses a substantial amount of utility in connection with a wide range of uses. Merely for the purpose of illustrating the obvious utility of our invention, its use in connection with an electric drill, not shown, will be described. When the driving shaft A is received within the chuck of an electric drill and the driven shaft B is provided with a similar chuck 32, shown in dotted lines in FIG. 1, an extremely handy device of many uses is provided. Of course, one use thereof would be in drilling holes in closely spaced objects, such as the studs or rafters of a house, the closeness of which usually prevents easy access thereto. From this illustration, it will be seen that our invention will be a great labor saving device in the hands of building tradesmen.

This invention has been thoroughly tested and found to be completely satisfactory for the accomplishment of the above objects; and while we have shown a preferred embodiment thereof, we wish it to be specifically understood that the same may be modified without departure from the scope and spirit of the appended claim.

What we claim is:

A universal joint in combination with a pair of angularly disposed shafts, said universal joint comprising a generally spherical joint head rigidly connected to one end of one of said shafts, a generally circular gimbal ring encompassing said spherical head and pivotally connected thereto at diametrically opposite points of said ring about an axis generally normal to the axis of said one of said shafts, the diameter of said ring being greater than the diameter of said spherical head, the pivotal connection between said spherical head and said ring including a pivot pin extending diametrically through said spherical head and said ring, said gimbal ring being so arranged and disposed with respect to said joint head as to permit slight radial adjustment therebetween about said pivot pin, and a generally hemispherical joint socket rigidly secured to one end of the other of said shafts and adapted to receive said ring and said head, said ring being pivotally connected to the interior of said socket about an axis generally normal to said aforesaid axis and also normal to the axis of said other of said shafts whereby rotation of either of said shafts is imparted to the other thereof, the pivotal connection of said ring to said socket including a pair of radially inwardly extending trunnions rigidly secured at diametrically opposite points to said socket and projecting through said ring at diametrically opposite points thereof, said socket being so arranged and disposed with respect to said gimbal ring as to permit slight radial adjustment therebetween about said trunnions.

(References on following page)

References Cited in the file of this patent

UNITED STATES PATENTS

| | | |
|---|---|---|
| 132,790 | Backus | Nov. 5, 1872 |
| 171,255 | Anthoine | Dec. 21, 1875 |
| 427,780 | Marsh | May 13, 1890 |
| 440,902 | Silver | Nov. 18, 1890 |
| 583,922 | McClellan | June 8, 1897 |
| 893,281 | Teal | July 14, 1908 |
| 1,216,508 | Spade | Feb. 20, 1917 |
| 1,853,171 | Nettenstrom | Apr. 12, 1932 |
| 1,894,986 | Frins | Jan. 24, 1934 |
| 2,711,199 | Salsberg | June 21, 1955 |

FOREIGN PATENTS

| | | |
|---|---|---|
| 857,392 | France | Sept. 9, 1940 |